United States Patent
Armstrong et al.

(10) Patent No.: US 11,300,359 B2
(45) Date of Patent: Apr. 12, 2022

(54) BLOCK STYLE HEAT EXCHANGER FOR HEAT PIPE REACTOR

(71) Applicant: Westinghouse Electric Company LLC, Cranberry Township, PA (US)

(72) Inventors: Clinton B. Armstrong, Slippery Rock, PA (US); Yasir Arafat, Pittsburgh, PA (US); Jurie J. Van Wyk, Cranberry Township, PA (US); Matthew R. Heisel, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 22 days.

(21) Appl. No.: 16/729,684

(22) Filed: Dec. 30, 2019

(65) Prior Publication Data
US 2021/0199383 A1    Jul. 1, 2021

(51) Int. Cl.
*F28D 7/00*     (2006.01)
*F28D 7/16*     (2006.01)
(Continued)

(52) U.S. Cl.
CPC ......... *F28D 7/0033* (2013.01); *F28D 7/1669* (2013.01); *F28D 9/0031* (2013.01);
(Continued)

(58) Field of Classification Search
CPC .... F28D 7/0033; F28D 7/1669; F28D 9/0031; F28D 15/02; F28D 2021/0054; B33Y 30/00
See application file for complete search history.

(56) References Cited

U.S. PATENT DOCUMENTS 1,965,553 A * 7/1934 Lear .................. F25D 31/002
                                                     165/140
5,915,469 A    6/1999 Abramzon et al.
(Continued)

FOREIGN PATENT DOCUMENTS

| CN | 104299656 B | 4/2017 |
| DK | 3225948 T3 | 10/2019 |
| WO | 2021138310 A1 | 7/2021 |

OTHER PUBLICATIONS

Search Report for corresponding Taiwan Application No. 109146948, dated Aug. 30, 2021.
(Continued)

*Primary Examiner* — Jon T. Schermerhorn, Jr.
(74) *Attorney, Agent, or Firm* — K&L Gates LLP

(57) ABSTRACT

A block style heat exchanger for a heat pipe reactor having a plurality of heat pipes extending from a reactor core. The heat exchanger includes a plurality of primary channels, each for receiving heat transferred from the core via one of the heat pipes. The primary channels extending within a block of one or more materials. The heat exchanger also includes a plurality of secondary channels defined within the block for transmitting a flow of the secondary heat transfer medium through the heat exchanger from an inlet to an outlet. The block is formed from one or both of: a plurality of plates bonded together, with each plate defining at least a portion of one or more of the plurality of primary channels and/or the plurality of secondary channels, and/or a unitary piece of material formed from an additive manufacturing process.

14 Claims, 6 Drawing Sheets

(51) Int. Cl.
  *F28D 9/00*   (2006.01)
  *B33Y 30/00*  (2015.01)
  *F28D 15/02*  (2006.01)
  *F28D 21/00*  (2006.01)

(52) U.S. Cl.
  CPC ............. *B33Y 30/00* (2014.12); *F28D 15/02* (2013.01); *F28D 2021/0054* (2013.01)

(56) References Cited

U.S. PATENT DOCUMENTS

| | | |
|---|---|---|
| 9,865,365 B2 | 1/2018 | Bang et al. |
| 2016/0027536 A1 | 1/2016 | McClure et al. |
| 2017/0089643 A1* | 3/2017 | Arafat .................. F28D 9/0093 |
| 2017/0191762 A1* | 7/2017 | Duesler ..................... F02C 7/12 |
| 2017/0205146 A1* | 7/2017 | Turney .................. F28D 7/0033 |
| 2017/0292791 A1* | 10/2017 | Zaffetti ..................... F28F 7/02 |
| 2018/0268950 A1 | 9/2018 | McKellar |
| 2019/0096536 A1* | 3/2019 | Arafat .................. G21C 15/257 |
| 2019/0162490 A1* | 5/2019 | Heusser .................. B01F 5/061 |
| 2019/0390914 A1 | 12/2019 | St. Rock et al. |
| 2021/0071959 A1* | 3/2021 | Streeter ..................... F28F 7/02 |

OTHER PUBLICATIONS

International Search Report and Written Opinion for International PCT Application No. PCT/US2020/067292, dated Apr. 9, 2021.

\* cited by examiner

BLOCK STYLE HEAT EXCHANGER FOR HEAT PIPE REACTOR

BACKGROUND

1. Field

The present invention pertains generally to heat exchangers and, more particularly, to block style heat exchangers particularly suited to transfer heat from a primary heat source to a secondary medium through a number of heat pipes.

2. Related Art

Supercritical carbon dioxide ($sCO_2$) is a fluid state of carbon dioxide where it is held at or above its critical temperature and critical pressure. Carbon dioxide usually behaves as a gas in air at standard temperature and pressure, or as a solid called dry ice when frozen. If the temperature and pressure are both increased from standard temperature and pressure to be at or above the critical point for carbon dioxide, it can adopt properties midway between a gas and a liquid. More specifically, carbon dioxide behaves as a supercritical fluid above its critical temperature (304.25 K, 31.10° C., 87.98° F.) and critical pressure (72.9 atm, 7.39 MPa, 1,071 psi), expanding to fill its container like a gas but with the density like that of a liquid.

$sCO_2$ is chemically stable, reliable, low-cost, non-toxic, non-flammable and readily available, making it a desirable candidate for a working fluid. Further, due to its superior thermal stability and non-flammability, direct heat exchange from high temperature sources is possible, permitting higher working fluid temperatures and therefore higher cycle efficiency. Unlike two-phase flow, the single-phase nature of $sCO_2$ eliminates the necessity of a heat input for phase change that is required for the water to steam conversion, thereby also eliminating associated thermal fatigue and corrosion. Despite the promise of substantially higher efficiency and lower capital costs, the use of $sCO_2$ presents material selection and design issues. Materials in power generation components must display resistance to damage caused by high-temperature, oxidation and creep. Candidate materials that meet these property and performance goals include incumbent alloys in power generation, such as nickel-based superalloys for turbomachinery components and austenitic stainless steels for piping. Components within $sCO_2$ Brayton loops suffer from corrosion and erosion, specifically erosion in turbomachinery and recuperative heat exchanger components and intergranular corrosion and pitting in the piping.

Prior to this point, no feasible primary heat exchanger design and manufacturing route has been conceived to integrate a $sCO_2$ secondary cycle into a heat pipe reactor. Most designs assume a block style heat exchanger with shell and tube style headers on either end of the heat exchanger, along the path of the heat pipes. This type of design requires the heat pipes to be protected from the high pressure $sCO_2$ in the open headers, although there is limited space between heat pipes. Integrating protective heat pipe sleeves into the header chambers and heat exchanger block section becomes difficult, if not impossible, due to the limited space available for connecting or welding the chamber and sleeves to the heat exchanger section and remaining real estate for the $sCO_2$ channels into the heat exchanger block. Thicker protective material around the heat pipe also reduces the heat transfer capability of the heat exchanger substantially.

Accordingly, it is an object of this invention to provide an integrated block style heat exchanger design that will practicably enable the heat output of a heat pipe reactor to be effectively transferred to a $sCO_2$ secondary side and operate with a minimum of maintenance.

SUMMARY

These and other objects are achieved in one aspect of the invention by an integrated block style heat exchanger for use with a heat pipe reactor having a plurality of heat pipes extending from a reactor core. The heat exchanger comprises: a plurality of primary channels each structured to receive heat transferred from the core via a corresponding one of the plurality of heat pipes, the plurality of primary channels defined within a block of one or more materials, each primary channel extending in a first direction along a longitudinal axis of the heat exchanger from a first end of the heat exchanger to a second end of the heat exchanger; and a plurality of secondary channels defined within the block, each secondary channel being structured to transmit a flow of the secondary heat transfer medium through the heat exchanger from an inlet to an outlet of the heat exchanger, each secondary channel comprising: a first portion extending from the inlet to adjacent at least one of the primary channels; a second portion extending along, being situated in heat exchange proximity to, and separated from, at the at least one of the primary channels; and a third portion extending from the second portion to the outlet, wherein each of the first portion and the second portion is disposed at a non-zero angle with respect to the second portion, and wherein the block comprises one or both of: a plurality of plates bonded together, with each plate defining at least a portion of one or more of the plurality of primary channels and/or the plurality of secondary channels, and/or a unitary piece of material formed from an additive manufacturing process.

The second portion of each secondary channel may comprise a plurality of separate sub channels, each spaced around the at least one of the primary channels and extending between the first portion and the third portion of the secondary channel.

The block may comprise the plurality of plates bonded together.

The plurality of plates may be arranged in a stack prior to, or as they are bonded together.

The plurality of plates may be bonded together via one or more of: diffusion bonding, brazing or hot isostatic pressing.

The portion of the one or more of the plurality of primary channels and/or the plurality of secondary channels may be formed via one or more of: machining, laser cutting, chemical etching, electrical discharge machining, electro-chemical machining, and/or stamping.

The block may comprise the unitary piece of material formed from the additive manufacturing process.

At least one of the inlet and/or the outlet may comprise a circumferential header cavity structured to transmit the flow of the secondary heat transfer medium to or from each secondary channel of the plurality of secondary channels.

The circumferential header cavity may extend along only a portion of a circumference of the heat exchanger.

The circumferential header cavity may extend along an entire circumference of the heat exchanger.

At least one of the inlet and the outlet may comprise an integral header.

The integral header may be a flanged header.

The plurality of secondary channels may exit the block via multiple plates.

The plurality of secondary channels may exit the block via a single plate.

As another aspect of the invention, a nuclear reactor comprises: a core; a block style heat exchanger such as described herein; and a plurality of heat pipes, each heat pipe extending from the core to a corresponding primary channel of the heat exchanger, wherein each heat pipe is structured to transfer heat from the core to the corresponding primary channel of the heat exchanger.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A further understanding of the invention can be gained from the following description of the preferred embodiments when read in conjunction with the accompanying drawings in which.

DETAILED DESCRIPTION OF EXEMPLARY EMBODIMENTS

Embodiments of the present invention provide block style heat exchanger arrangements that enable the integration of a $sCO_2$ secondary cycle into a heat pipe reactor. The block style heat exchanger is generally formed from a block (of any suitable shape) of material (generally referred to herein as "the block") contains channels for the heat pipes coming from the reactor along with smaller channels for the $sCO_2$ defined/formed therein. The smaller channels extend between inlets and outlets and are positioned around and extend along the heat pipes. The center heat exchanger portion of the block is made up of thin sheet metal shims or plates, which contain through holes for both the heat pipe channels and the $sCO_2$ channels. The shims or plates may be produced, for example, without limitation, by machining, laser cutting, chemical etching, EDM (Electrical Discharge Machining), ECM (Electro-Chemical Machining), stamping or other metal fabrication methods. The end sections of the block can also be made from similar shims, which contains holes and channels, produced, for example, by laser cutting, machining, EDM, ECM or chemical etching, to create $sCO_2$ flow paths perpendicular to the heat pipe, in order for the $sCO_2$ channels to collect in headers on the periphery of the block. The entire plate portion of the heat exchanger is bonded into a single block using, for example, diffusion bonding, brazing or hot isostatic pressing. The heat exchanger headers may be internal chambers, slots or channels within the block that are cut/formed in the individual shims, or chambers that are attached to the outside of the main heat exchanger block.

Alternatively, the block style heat exchangers described herein may be produced entirely or in sections using various additive manufacturing technologies including large scale powder bed fusion, directed energy deposition, binder jetting, ultrasonic, friction stir and/or hybrid additive manufacturing. As used herein, the phrase "and/or" shall mean either one, or both of the items separated by such phrase (i.e., something including A and/or B may include A alone, B alone, or both A and B.

Figure 1:
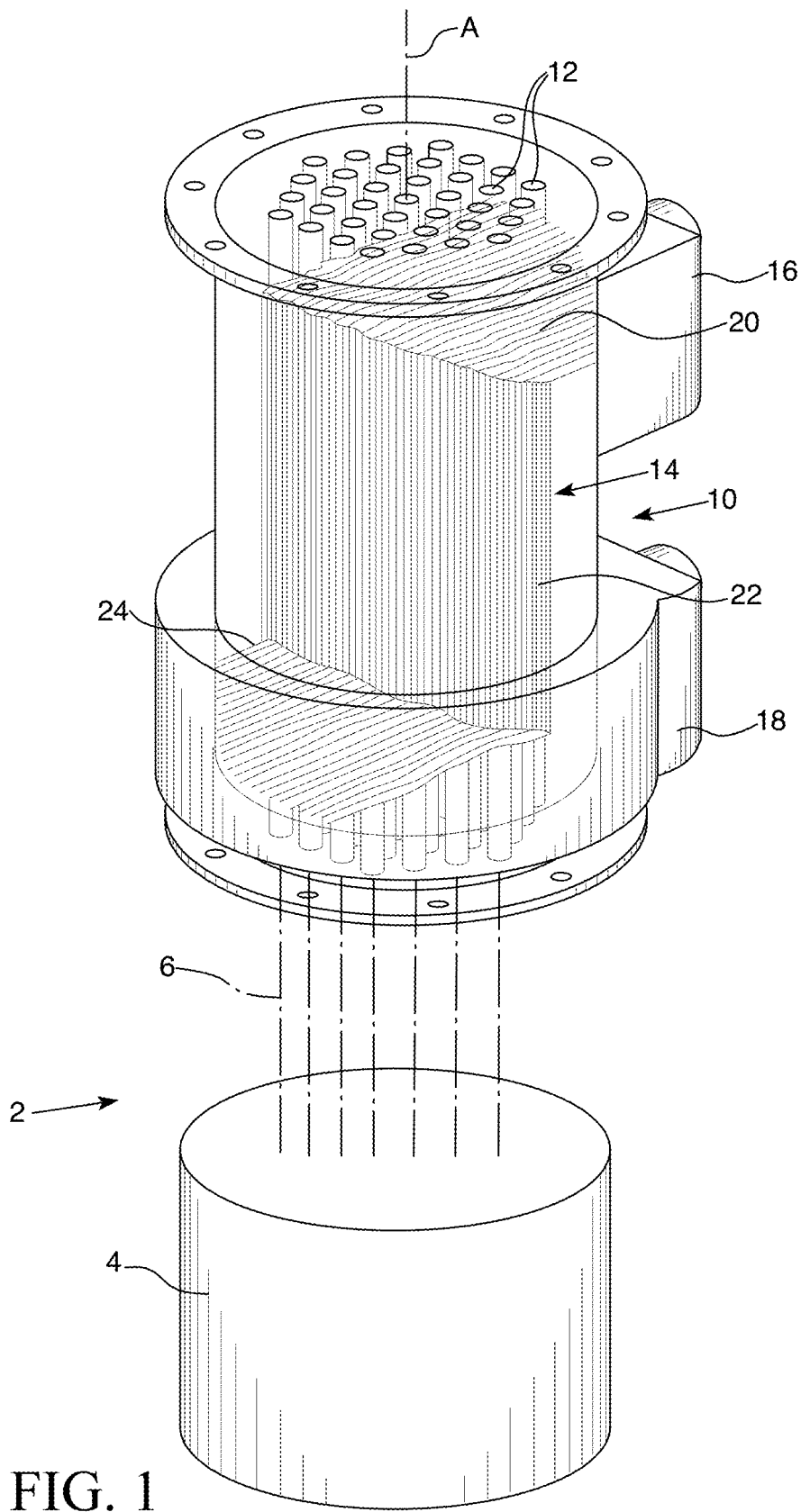
FIG. 1 is a partially schematic perspective view of a portion of a heat pipe reactor and a block style heat exchanger in accordance with one example embodiment of the present invention with an open circumferential header cavity attached to the blocks, with the peripheral portions of the heat exchanger shown partially transparent so the internal passageways and tubular openings can be visualized.

FIG. 1 illustrates a partially schematic perspective view of a portion of a heat pipe nuclear reactor 2 having a reactor core 4 and a plurality of heat pipes 6, each heat pipe 6 extending from core 4 to a block style heat exchanger 10 in accordance with one example embodiment of the present invention. Heat exchanger 10 is formed generally as a block of material of materials (such as the cylindrically shaped block of FIG. 1) and includes a plurality of primary channels 12 defined therein that extend generally in a first direction along a longitudinal axis A of heat exchanger 10. Each of primary channels 12 is formed generally as a tubular member that is structured to transmit a flow of a primary heat transfer medium through heat exchanger 10. In the example embodiment illustrated in FIG. 1, each heat pipe 6 extends from core 4 to a corresponding primary channel 12. Each heat pipe 6 is structured to transfer heat from core 6 to the corresponding primary channel 12 of heat exchanger 10. Heat exchanger 10 also includes a plurality of smaller secondary channels 14 defined in the block of material, with each secondary channel 14 being structured to transmit a secondary heat transfer medium (e.g., $sCO_2$) between a circumferential inlet header 16 and a circumferential outlet header 18. In the example illustrated in FIG. 1, each secondary channel 14 extends from inlet header 16 along a first portion 20 to adjacent a corresponding primary channel 12, where secondary channel 14 then transitions from first portion 20 to a second portion 22 that is disposed along the primary channel 12 over a heat exchange portion of the heat exchanger 10. Second portion 22 of each of secondary channels 14 is in heat exchange proximity to, but spaced from, the corresponding primary channel 12. As will be appreciated from the examples discussed herein, second portion 22 of each secondary channel 14 may consist of a single channel running along primary channel 12 or may be a plurality of (i.e., two or more) sub-channels positioned around primary channel 12. At the lower end of the heat exchange portion of heat exchanger 10 each secondary channel 14 transitions from second portion 22 to a third portion 24 that extends from near primary channel 12 to outlet header 18. In the example shown in FIG. 1, second portions 22 of secondary channels 14 are positioned generally vertically along longitudinal axis A while first and third portions 20 and 24 of secondary channels 14 are positioned generally normal (i.e., generally at 90°) to axis A, however, it is to be appreciated that first and third portions 20 and 24 of secondary channels 14 may be oriented at any non-zero angle with respect to second portions 22 without varying from the scope of the present invention.

Continuing to refer to FIG. 1, circumferential inlet and outlet headers 16 and 18 may extend completely around heat exchanger 10, such as illustrated by the outlet header 18 in FIG. 1, or may extend only partially around the heat exchanger 10, as illustrated by the inlet header 16 in FIG. 1. Circumferential headers 16 and 18 may be formed as separate components and attached to the heat exchanger 10 via any suitable means (e.g., without limitation, mechanically or by welding) or may be formed integrally with heat exchanger 10 via any suitable means.

Figure 2:
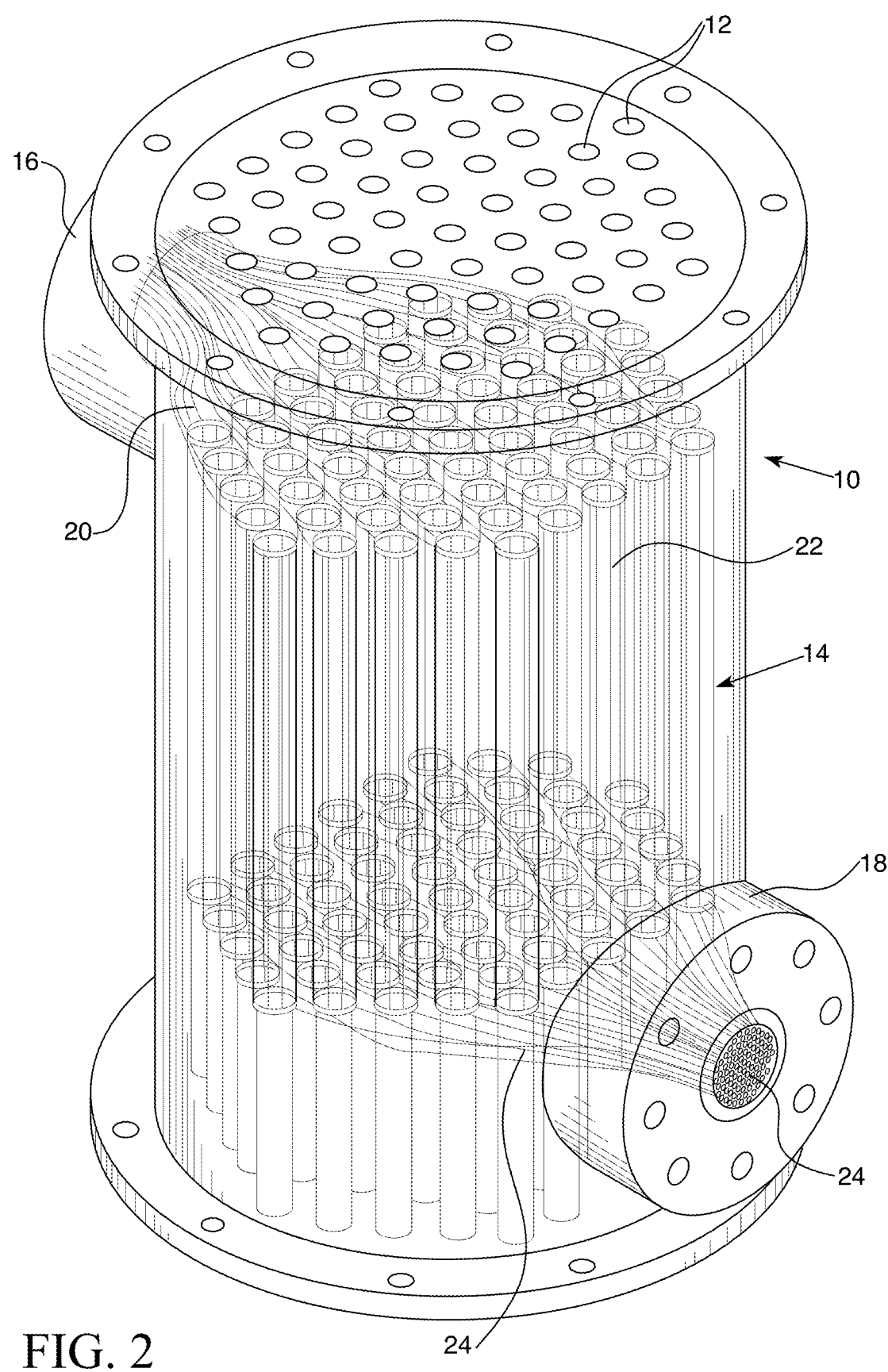
FIG. 2 is a view similar to that of FIG. 1 of another block style heat exchanger in accordance with another example embodiment of the present invention having integral headers and flanges.

FIG. 2 illustrates another heat exchanger 10 in accordance with a second embodiment of the present invention that includes integral inlet and outlet headers 16 and 18 instead of the circumferential inlet and outlet headers 16 and 18 shown in FIG. 1. In all other respects, heat exchanger 10, illustrated in FIG. 2, is the same as the heat exchanger 10 illustrated in FIG. 1.

Figure 3:
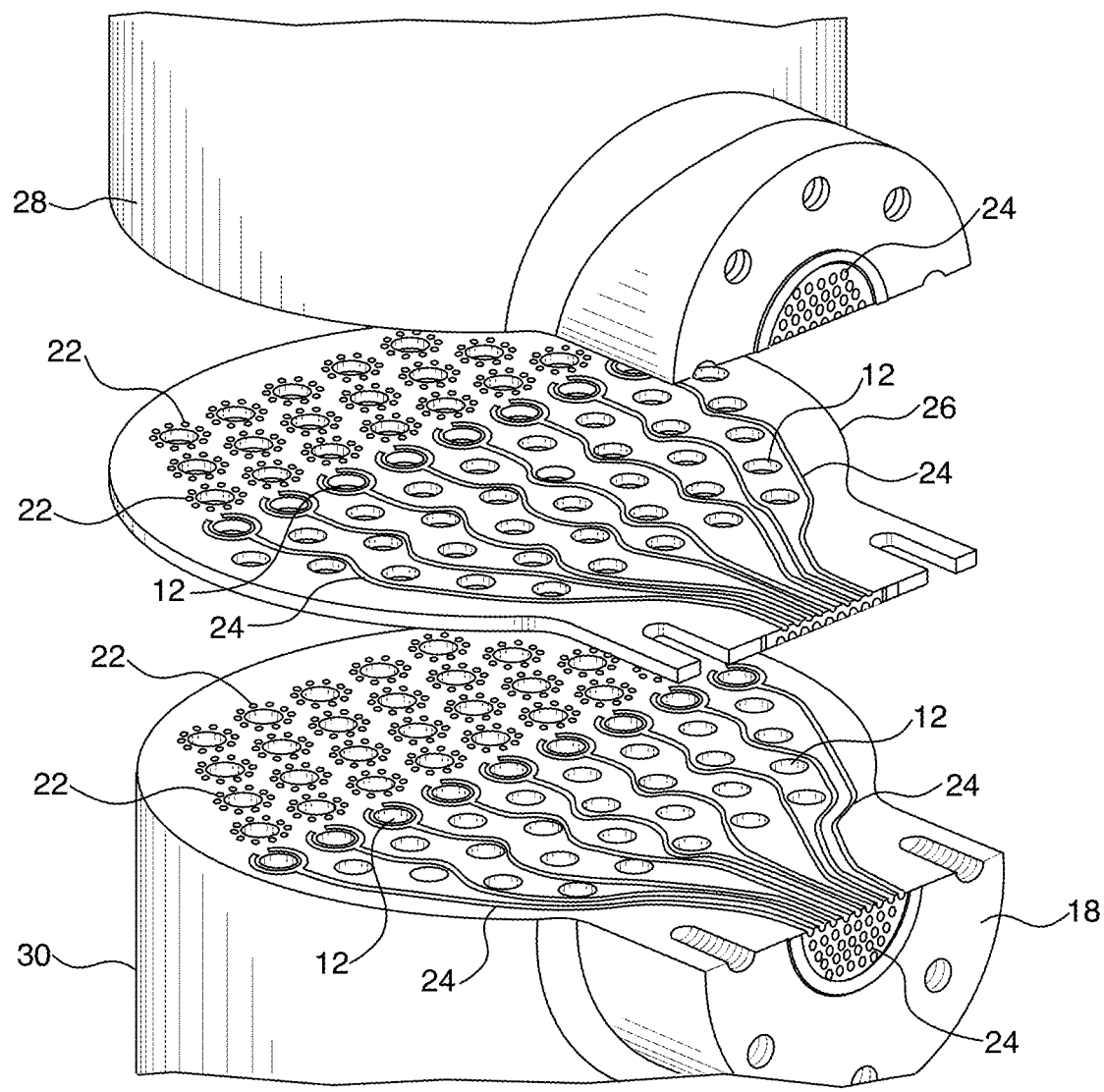
FIG. 3 is a partially exploded view of a header region of the heat exchanger of FIG. 2.

FIG. 3 shows a partially exploded view of a portion of outlet header 18 of heat exchanger 10 of FIG. 2, showing third portions 24 of secondary channels 14 that extend from adjacent primary channels 12 to the outlet header 18 with second portions 22 of secondary channels 14 traversing multiple layers of the block segments 26, which are also referred to herein as shims or plates. Though the upper segment 28 and the lower segment 30 of FIG. 3 are shown as thick portions of the heat exchange portion, each of the segments 28 and 30 may be, and preferably are, made up of multiple layers of plates 26 that are bonded together. Each of the secondary channels 14 may be formed by any suitable machining process, or by chemical or laser etching. From such view it is to be appreciated that in such example second portions 22 of each secondary channel 14 consist of a plurality of small conduits or sub-channels circumferentially spaced around the respective primary channel 12.

Figure 4:
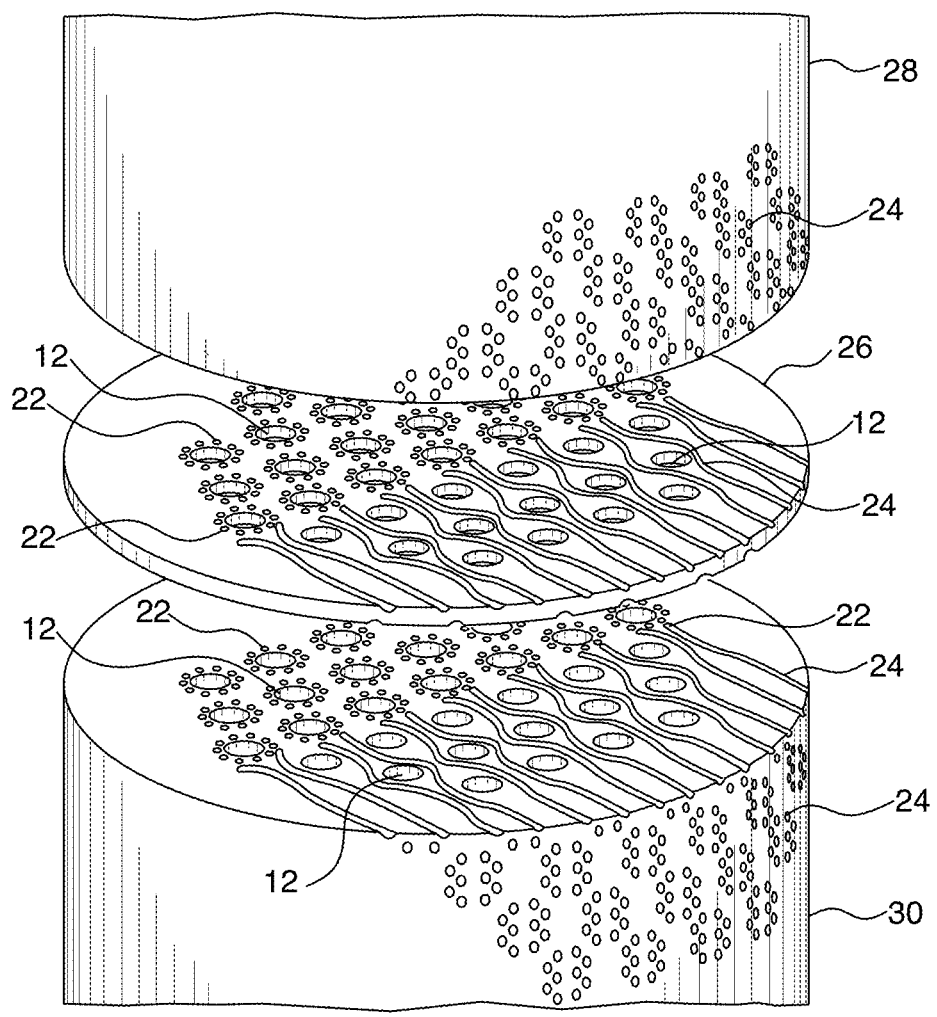
FIG. 4 is a partially exploded views of a header region similar to the arrangement shown in FIG. 3 except such arrangement is structured to interface with circumferential headers such as shown in FIG. 1 rather than the integrated headers such as shown in FIG. 2.

FIG. 4 shows a similar arrangement as FIG. 3 except the arrangement of FIG. 4 can interface with circumferential headers 16 and 18 such as those illustrated in FIG. 1, rather than the integrated headers 16 and 18 such as illustrated in FIGS. 2 and 3.

Figure 5:
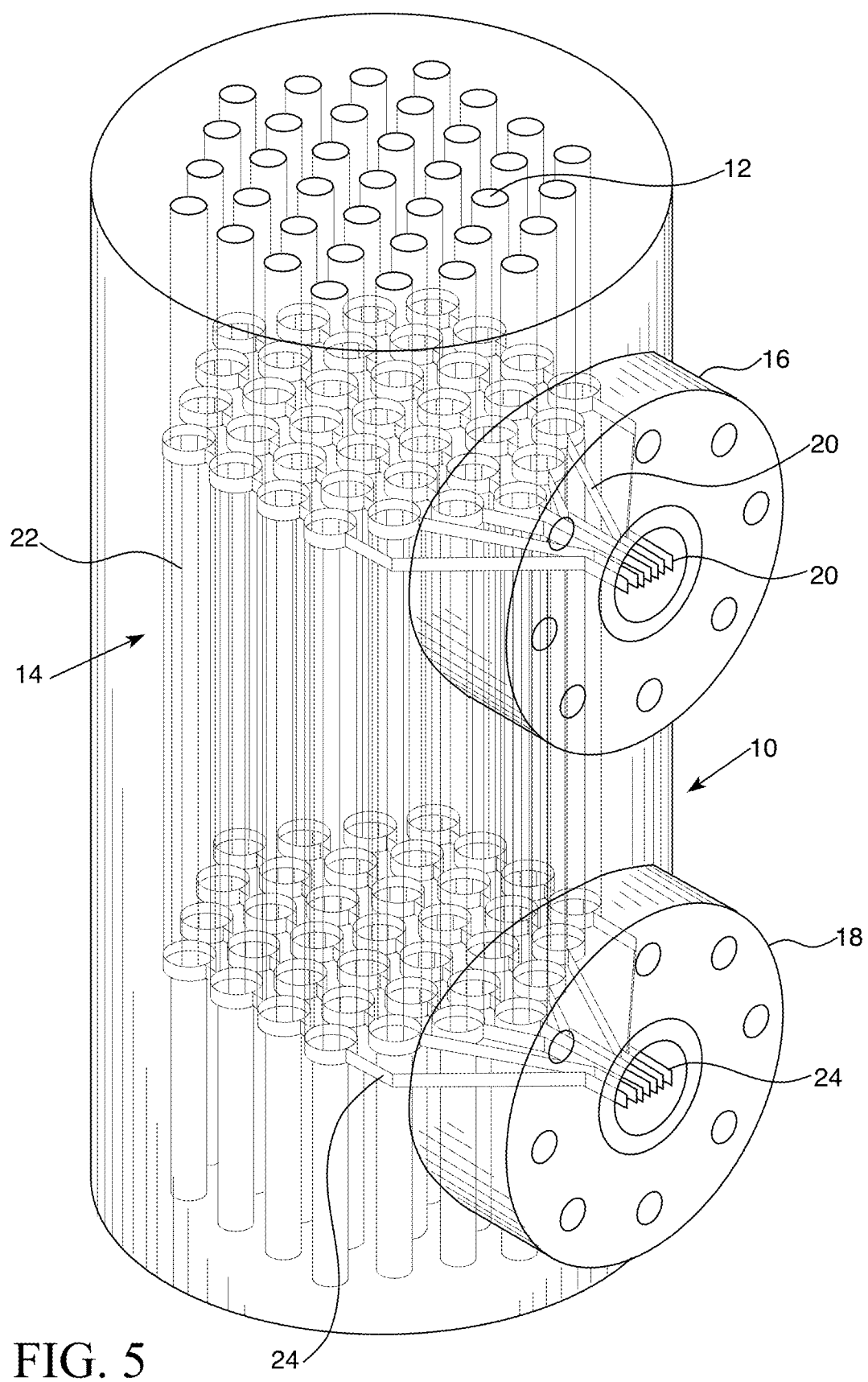
FIG. 5 is a view similar to that of FIGS. 1 and 2 of yet another block style heat exchanger in accordance with yet another example embodiment of the present invention in which the secondary fluid enters and exits the heat exchanger through a single block layer.
Figure 6:
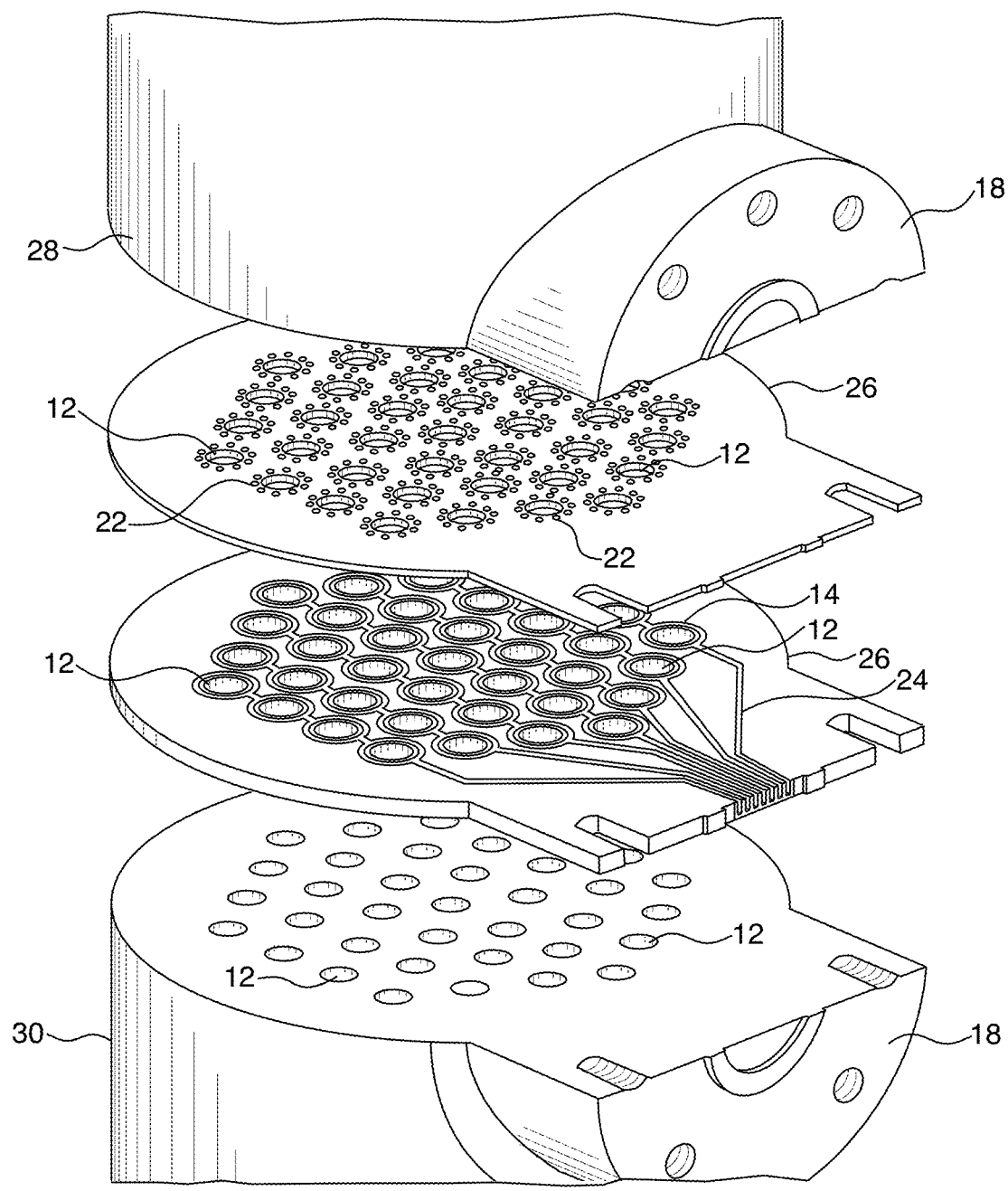
FIG. 6 is a partially exploded view of a header region of the heat exchanger of FIG. 5.

FIGS. 5 and 6 show a similar arrangement to that shown in FIGS. 3 and 4 except third portions 24 of secondary channels 14 are only defined in, and extend in one layer of the plates 26, rather than through the tiered layers such as shown in the arrangement of FIG. 3. Note that in such example the layer 26 housing third portions 24 of secondary channels 14 is much thicker than the other layers of plates 26 in order to accommodate a sufficient volume of the secondary heat transfer medium.

While the heat exchanger arrangements described herein are especially suited for interfacing a heat pipe reactor to a $sCO_2$ secondary cycle, it is to be appreciated that the arrangements are applicable to other applications where the primary fluid would transverse the primary channels 12 and the secondary fluid would traverse the secondary channels 14. Various shim (i.e., plate or block segment) manufacturing and bonding options enable multiple design feature options, including heat exchanger size, length, primary channel size, secondary channel size, shape, and path, and header size, shape and location. Alternatively, or in addition to, the heat exchangers could be produced with a variety of additive manufacturing techniques, including powder bed fusion, binder jetting, directed energy deposition or hybrid additive manufacturing, in a similar layered approach. The layered approach enables automation during manufacturing, such as laser cutting, CNC (Computer Numerical Control) machining, forming process and plate stacking and handling automation process, which enables automated fabrication of nuclear reactors.

While specific embodiments of the invention have been described in detail herein, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An integrated block style heat exchanger for use with a heat pipe reactor having a plurality of heat pipes extending from a reactor core, the heat exchanger comprising:
   a plurality of primary channels each structured to receive heat transferred from the core via a corresponding one of the plurality of heat pipes, the plurality of primary channels defined within a block of one or more materials, each primary channel extending in a first direction along a longitudinal axis of the heat exchanger from a first end of the heat exchanger to a second end of the heat exchanger; and
   a plurality of secondary channels defined within the block, each secondary channel being structured to transmit a flow of the secondary heat transfer medium through the heat exchanger from an inlet to an outlet of the heat exchanger, each secondary channel comprising:
      a first portion extending from the inlet to adjacent at least one of the primary channels;
      a second portion extending along, being situated in heat exchange proximity to, and separated from, at the at least one of the primary channels; and
      a third portion extending from the second portion to the outlet,
      wherein each of the first portion and the third portion is disposed at a non-zero angle with respect to the second portion,
      wherein the second portion of each secondary channel comprises a plurality of separate sub channels, each spaced around the at least one of the primary channels and extending between the first portion and the third portion of the second channel, and
   wherein the block comprises one or both of:
      a plurality of plates bonded together, with each plate defining at least a portion of one or more of the plurality of primary channels and/or the plurality of secondary channels, and/or
      a unitary piece of material formed from an additive manufacturing process.

2. The integrated block style heat exchanger of claim 1, wherein the block comprises the plurality of plates bonded together.

3. The integrated block style heat exchanger of claim 2, wherein the plurality of plates are arranged in a stack prior to, or as they are bonded together.

4. The integrated block style heat exchanger of claim 2, wherein the plurality of plates are bonded together via one or more of: diffusion bonding, brazing or hot isostatic pressing.

5. The integrated block style heat exchanger of claim 2, wherein the portion of the one or more of the plurality of primary channels and/or the plurality of secondary channels is formed via one or more of: machining, laser cutting, chemical etching, electrical discharge machining, electrochemical machining, and/or stamping.

6. The integrated block style heat exchanger of claim 2, wherein the plurality of secondary channels exit the block via multiple plates.

7. The integrated block style heat exchanger of claim 2 wherein the plurality of secondary channels exit the block via a single plate.

8. The integrated block style heat exchanger of claim 1, wherein the block comprises the unitary piece of material formed from the additive manufacturing process.

9. The integrated block style heat exchanger of claim 1, wherein at least one of the inlet and/or the outlet comprises a circumferential header cavity structured to transmit the flow of the secondary heat transfer medium to or from each secondary channel of the plurality of secondary channels.

10. The integrated block style heat exchanger of claim 9, wherein the circumferential header cavity extends along only a portion of a circumference of the heat exchanger.

11. The integrated block style heat exchanger of claim 9, wherein the circumferential header cavity extends along an entire circumference of the heat exchanger.

12. The integrated block style heat exchanger of claim 1, wherein at least one of the inlet and the outlet comprises an integral header.

13. The integrated block style heat exchanger of claim 12, wherein the integral header is a flanged header.

14. A nuclear reactor comprising:
a core;
a block style heat exchanger comprising:
   a plurality of primary channels each structured to receive heat transferred from the core via a corresponding one of the plurality of heat pipes, the plurality of primary channels defined within a block of one or more materials, each primary channel extending in a first direction along a longitudinal axis of the heat exchanger from a first end of the heat exchanger to a second end of the heat exchanger; and
a plurality of secondary channels defined within the block, each secondary channel being structured to transmit a flow of the secondary heat transfer medium through the heat exchanger from an inlet to an outlet of the heat exchanger, each secondary channel comprising:
   a first portion extending from the inlet to adjacent at least one of the primary channels;
   a second portion extending along, being situated in heat exchange proximity to, and separated from, at the at least one of the primary channels; and
   a third portion extending from the second portion to the outlet,
   wherein each of the first portion and the third portion is disposed at a non-zero angle with respect to the second portion,
   wherein the second portion of each secondary channel comprises a plurality of separate sub channels, each spaced around the at least one of the primary channels and extendinq between the first portion and the third portion of the second channel, and
wherein the block comprises one or both of:
   a plurality of plates bonded together, with each plate defining at least a portion of one or more of the plurality of primary channels and/or the plurality of secondary channels, and/or
   a unitary piece of material formed from an additive manufacturing process; and
a plurality of heat pipes, each heat pipe extending from the core to a corresponding primary channel of the heat exchanger,
wherein each heat pipe is structured to transfer heat from the core to the corresponding primary channel of the heat exchanger.

* * * * *